Patented Aug. 24, 1954

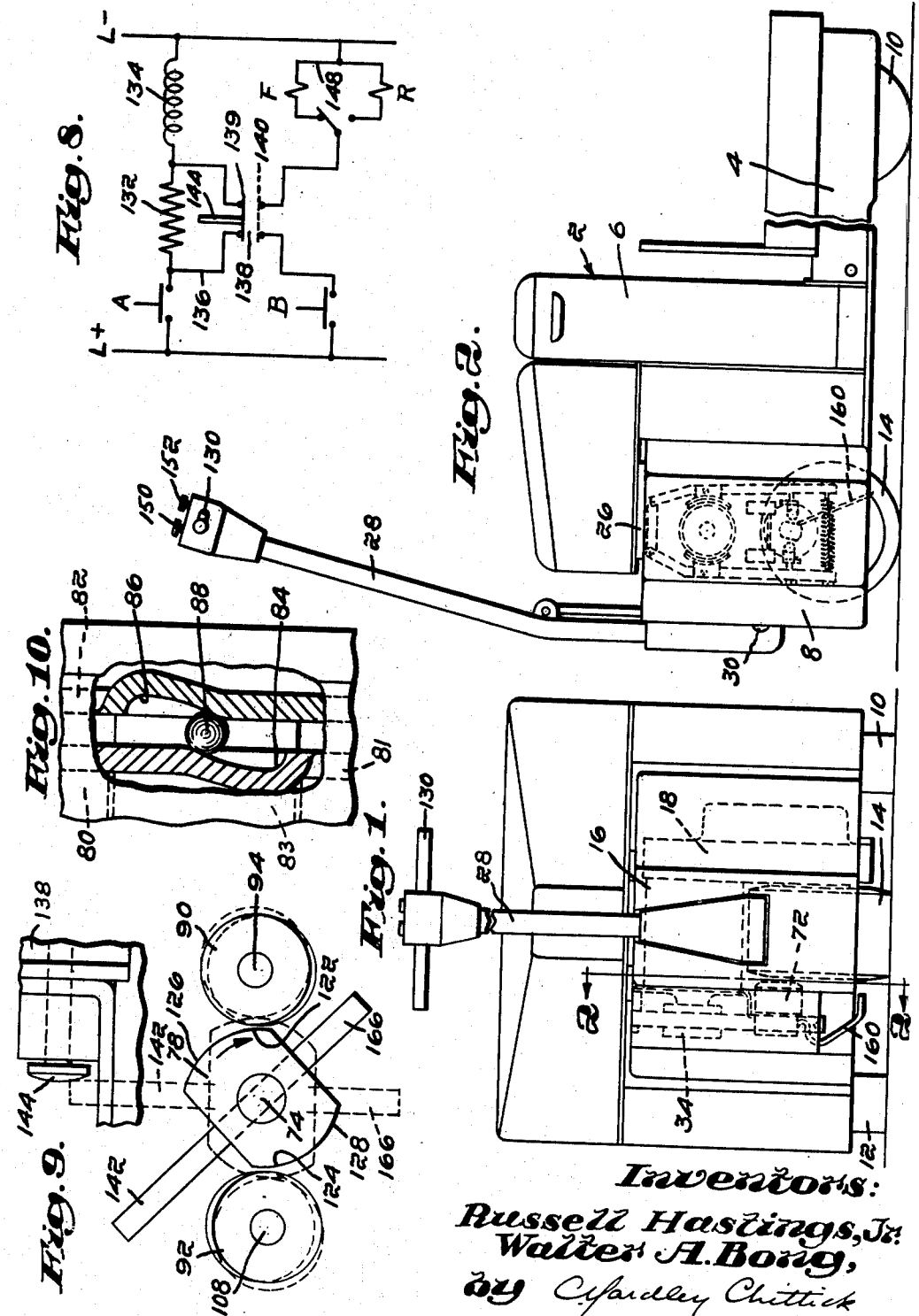

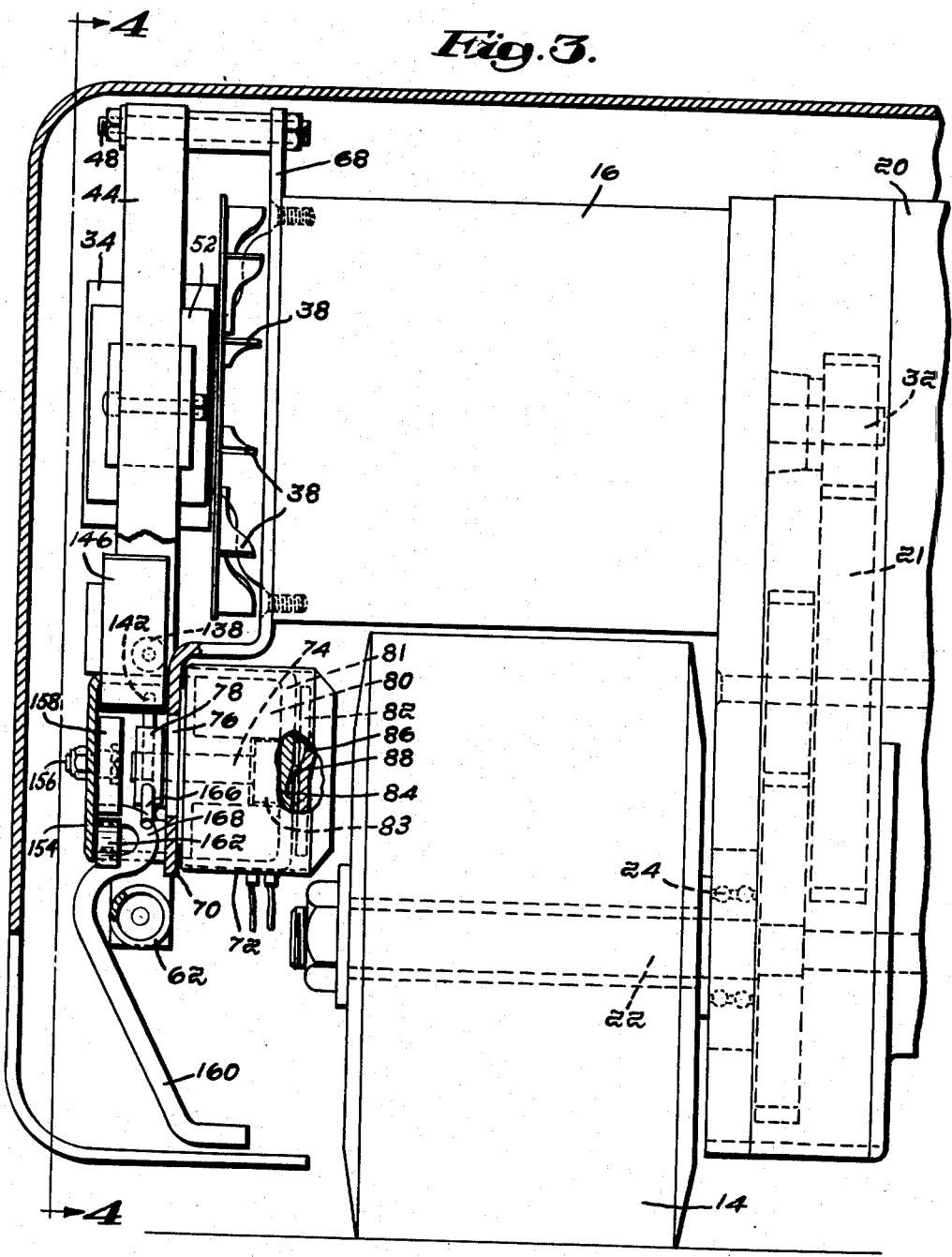

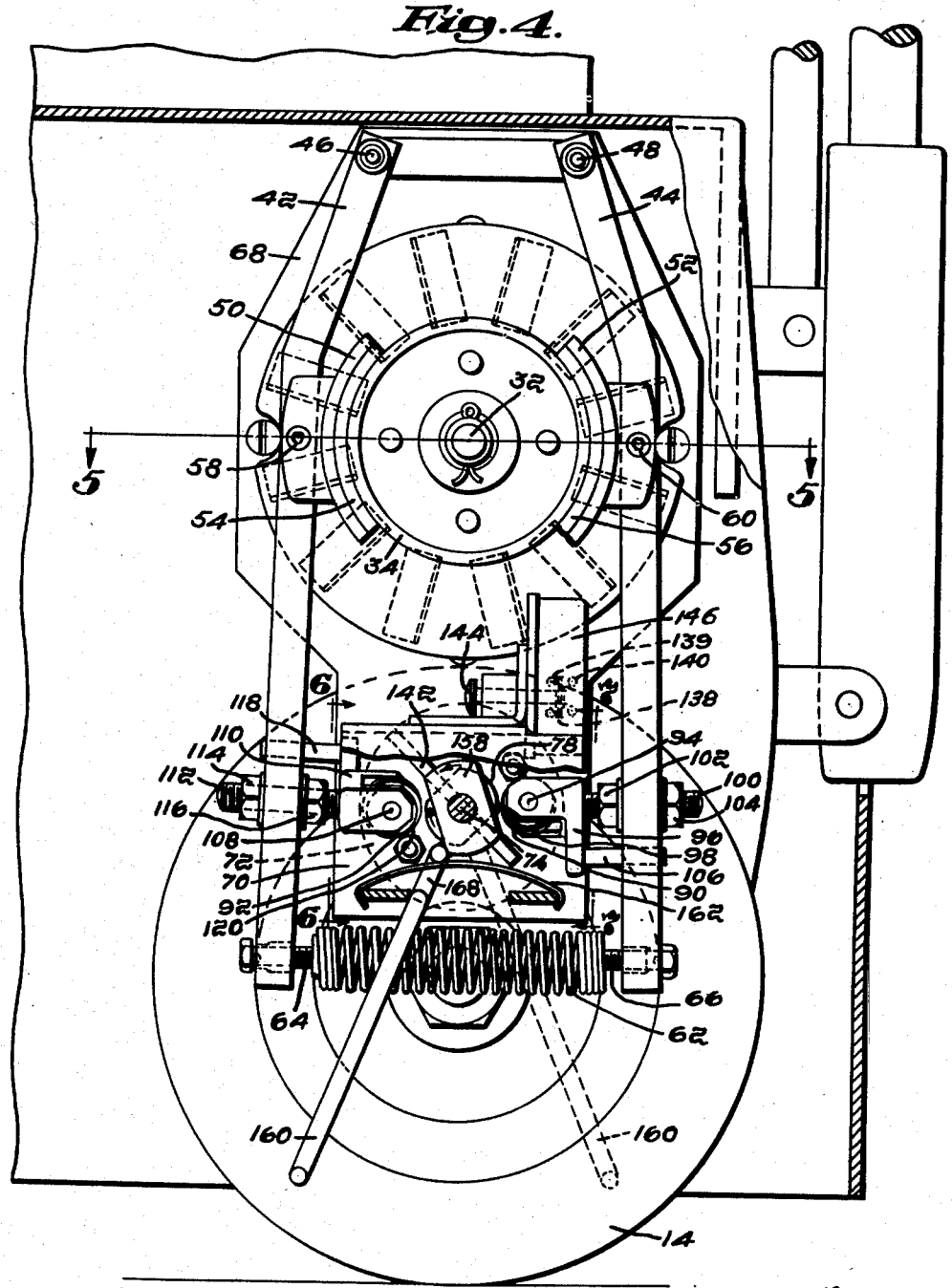

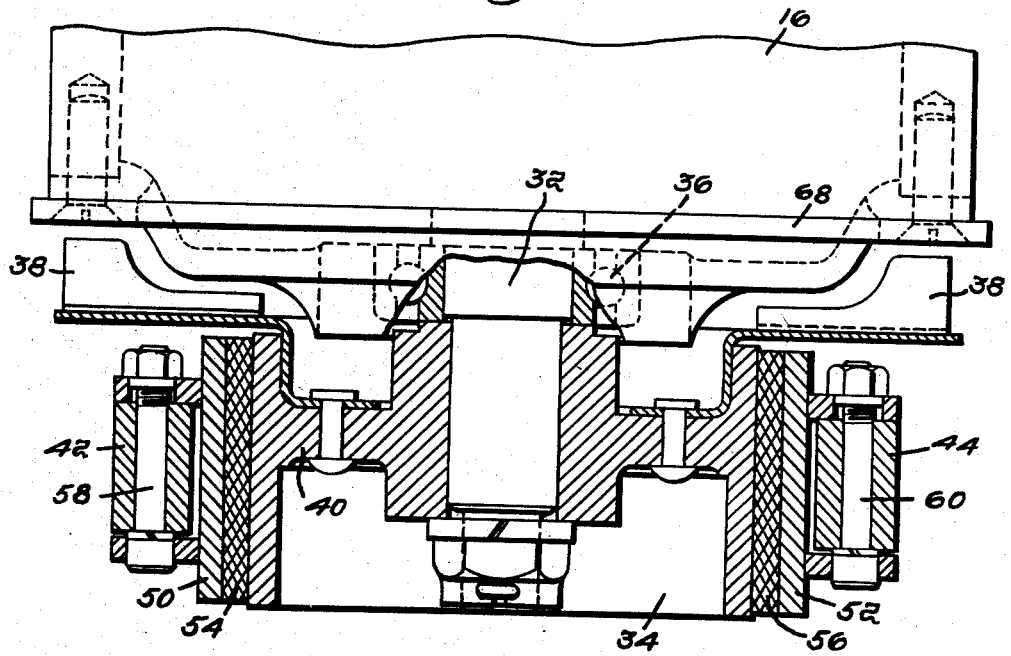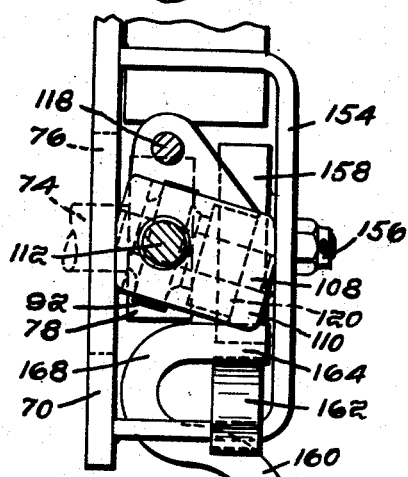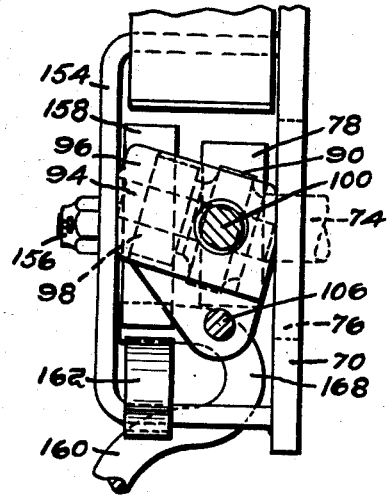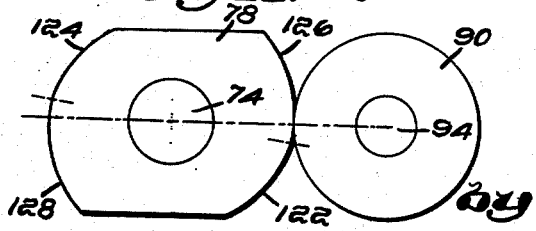

2,687,190

UNITED STATES PATENT OFFICE 2,687,190

BRAKE CONSTRUCTION

Russell Hastings, Jr., Wellesley Hills, and Walter A. Bong, Dedham, Mass., assignors to Lewis-Shepard Company, Watertown, Mass., a corporation of Massachusetts Application December 13, 1951, Serial No. 261,516

13 Claims. (Cl. 188—171)

This invention relates to brakes. It is particularly concerned with a new and useful brake of a type especially adapted to be used with electrically operated trucks of the type commonly used in factories and warehouses for handling materials.

The trucks of the type in question are commonly made with three wheels, in which the two rear wheels are free to rotate and carry the major portion of the load, while the third front wheel is the driving and steering wheel. These trucks are customarily battery operated with the battery driving a suitable electric motor which is geared to the driving wheel. The truck may be guided by an operator through the use of a handle that carries electric switches which, when operated, cause the motor to start and stop, to move forward or backward.

Trucks of this type usually stand idle for a total time greater than the time they are in use. Therefore, it is desirable that when the truck is idle, no power is being consumed from the battery. Accordingly, it is customary to use spring actuated brakes which require no electrical power when the truck is not in use and the brakes are in "on" position and which will function automatically to stop the truck upon electrical failure, thereby providing increased safety. Electrical power, however, is required to release the brakes before the motor is put in operation to move the truck. It is, therefore, desirable that the brake mechanism should be so designed that the brake will be completely released before the electric power to the motor is turned on for otherwise the drag of the unreleased brake would cause serious drain on the batteries and perhaps damage to the motor. That is, if the brakes were not fully released before closing the motor circuit, the voltage drop occurring as the motor starts might preclude the completion of the brake releasing operation, with the bad result that the motor would then be operating with the brake partially on and the battery would be subject to an excessive load. Accordingly, one object of this invention is to provide a brake construction and electrical connections related thereto which will insure that the brake will be completely released before current is applied to the motor, so that the motor may operate without braking restriction.

A further object of the invention is the provision of a construction which will require a minimum amount of electrical current to move the brakes from "on" to "off" position and to hold them in "off" position thereafter while the truck is in operation. Heretofore, the braking system used on trucks of the type in question has commonly utilized a solenoid of the push-pull type as the brake releasing means. With a push-pull solenoid, however, it is well understood that at the start of the stroke, the power output is low with the power output increasing as the stroke advances. The toggle mechanism that has been used heretofore as the releasing means for the brake requires the greatest force to be applied at the commencement of the toggle movement. The force requirement decreases as the brake is released. Thus, a solenoid that is powerful enough to release the brake at the start of its stroke when it is relatively inefficient will have power greatly in excess of the requirements at the end of its stroke. Consequently, former constructions have required the use of current consumption in the order of 100 amperes for releasing the brake even though less current is used thereafter to hold the brake in "off" position. Heavy current use not only causes excessive drain on the batteries but also requires the use of expensive switches and relays.

Accordingly, we propose in the present construction to use a rotary solenoid in which the power output curve is relatively flat over the entire stroke. While the stroke of the shaft of a rotary solenoid is small in a longitudinal direction, still the rotation of the shaft may be from 25 to 95 degrees, according to the design of the solenoid, and, over such angular rotation, the power output remains substantially constant.

Therefore, in the present invention we have designed the brake releasing mechanism to take advantage of the relatively constant force available in a rotary solenoid. This permits the use of a solenoid requiring only a fraction of the amperage needed by a conventional push-pull solenoid to release brakes of the same strength. As a by-product of this construction, the switches used are low priced as the current handled is in the order of 10 amperes to cause brake release and 3 amperes to hold the brakes in released position.

It will further be understood by those familiar with this art that from time to time a truck may become disabled, from battery failure or other interruption of electrical power supply, at a point remote from the service station. Under such conditions it becomes necessary to release the brake manually in order to tow the truck to the service station. In the manual brake release mechanisms now known in this field, there has been no way of automatically returning such release mechanism from "off" to "on" position after the interruption to the electrical power supply has been eliminated and the power is once more available to the motor.

Accordingly, another object of the invention is the provision of means for manually releasing the brakes at any time combined with mechanism which will automatically throw the manual release into its normal "on" position whenever the truck is thereafter set into motion by the application of current to the motor. This improved construction is effective in preventing accidents of the type which can readily occur in the use of the trucks of the prior art. In the earlier trucks, should the manual brake release have been placed in "off" position by the operator, no provision has been made for automatically returning the manual release from "off" to "on" position when the driving motor is first thereafter actuated. As a result, the operator, on shutting off the electric driving motor, has found himself unable to stop the truck as the manual release was still effective to keep the brake in "off" position. In the present invention, this cannot happen as each time the motor is operated, the manual release, if then in "off" position, will automatically be restored to "on" position so that the brakes can function thereafter when the motor is shut off.

A further object of the invention is the provision of adjusting mechanisms in the brake construction which will provide release with equal clearance of each brake shoe from the brake drum. By virtue of the provision of equal release, the required clearance in "off" position between the brake shoes and brake drum may be materially reduced so that the throw of the brake levers may correspondingly be reduced and be within the scope of the action provided by rotation of the rotary solenoid actuated cam.

These and other objects of the invention will become more apparent as the description proceeds with the aid of the accompanying drawings in which Fig. 1 is a front view of a typical truck with which our new brake may be used. This view shows in dotted lines the general location of the brake at the left of the motor.

Fig. 2 is a side elevation of the truck shown in Fig. 1 with the brake mechanism as viewed on the line 2—2 of Fig. 1 shown in dotted lines.

Fig. 3 is an enlarged front elevation of the motor driving wheel and brake mechanism as it appears from the front with the housing broken away.

Fig. 4 is a side elevation on the line 4—4 of Fig. 3.

Fig. 5 is a section on the line 5—5 of Fig. 4, drawn to double scale, showing details of the brake drum and brake shoes.

Fig. 6 is an enlarged side elevation taken on the line 6—6 of Fig. 4, showing the solenoid operated cam and one roller against which it exerts its force and the manually operated release cam and one of its related rollers.

Fig. 7 is a view on the line 7—7 of Fig. 4, similar to Fig. 6, showing the cams and rollers from the opposite side.

Fig. 8 is a circuit diagram which is designed to insure that the brake is off before power can be applied to the driving motor.

Fig. 9 is an enlarged view of the solenoid actuated cam and the rollers engaged thereby.

Fig. 10 is an enlarged view of the armature plate and ball grooves or races shown in the side of the rotary solenoid appearing in Fig. 3.

Fig. 11 is an enlarged view of cam 78 showing more plainly the relatively steep pitch of the leading portion of the cam surface and the lesser pitch of the adjacent portion of the cam surface against which roller 90 is shown in holding position.

Referring to Figs. 1 and 2, which show one type of truck with which our invention may be used, it will be seen that the truck 2 has a body comprising a frame and lift member 4 of conventional construction, a battery compartment 6 and a pivoted front drive wheel assembly 8. The two rear wheels 10 and 12 are freely rotatable on their axles while the third wheel 14 provides the moving force. Wheel 14 is driven by an electric motor 16 through a set of gears 18 suitably housed at the side of the motor and drive wheel.

Further details of this construction may be seen in Fig. 3 in which the motor 16, carried by a rigid frame 20, drives through a set of gears 21 to the axle 22 to which is keyed the drive wheel 14. Axle 22 is suitably supported by bearings 24 in the frame 20. The construction of the motor and drive wheel thus far described is conventional and constitutes no part of the present invention. It will be understood that the frame 20 is pivotally mounted with respect to the main truck frame at 26 so that through the medium of a handle 28, pivoted to the frame 20 at 30, the frame 20 and drive wheel 14 may be swung to the right or left to direct the movement of the truck.

As can be seen in Fig. 3, the motor 16 has its shaft 32 extending from both ends thereof. On one end is mounted a gear train 21 and on the other end is mounted a keyed on brake drum 34, the details of which can be seen best in Figs. 4 and 5. The brake drum construction is conventional. There are suitable shaft bearings at 36. Fan elements 38 are attached to the web 40 of the brake drum 34 and the braking surface is on the outer side of the drum. It is believed apparent that if a braking force is applied to brake drum 34 to stop rotation of shaft 32, it will be effective to stop rotation of drive wheel 14 and thus bring the truck to a halt.

The means for applying a braking force to brake drum 34 will now be described. Two levers 42 and 44 are pivoted respectively at 46 and 48. These levers, bent as shown, extend downwardly past opposite sides of the brake drum and have affixed thereto brake shoes 50 and 52, the inner sides of which carry brake linings 54 and 56. The brake shoes are pivotally mounted on levers 42 and 44 by means of bolts 58 and 60. This construction may be seen in more detail in Fig. 5.

It is believed apparent that if the lower ends of levers 42 and 44 are drawn toward each other, the brake shoes will engage and exert a pressure on the brake drum tending to stop rotation of the latter. This braking force is applied in our construction by means of a tension spring 62, adjustably secured at either end by the bolts 64 and 66 to the lower ends of levers 42 and 44. This construction permits adjusting the force drawing the levers together so that a proper braking pressure may be applied by the brake shoes against the brake drum. When the levers 42 and 44 are free to be drawn together by spring 62, the maximum braking effect is then present on brake drum 34 and in this condition the brake is said to be "on" and this is the condition in which the brake will be when the truck is standing idle with the electric current off. When it is desired to put the truck in motion, means must be provided to cause release of the brake by adequate separation of levers 42 and 44, thus moving the brake from "on" to "off" position. This releasing means will now be described.

The plate 68 mounted on the end of motor 16 and carrying the pivots 46 and 48, heretofore referred to, extends outwardly and downwardly to provide a smaller depending plate 70 which is of sufficient size and rigidity to carry a rotary solenoid 72. This solenoid is shown in side elevation in Fig. 3 and an enlarged detail of a portion of the solenoid is shown in Fig. 10.

The solenoid is rigidly bolted to plate 70 and has its shaft 74 extending through an opening 76 in plate 70 and carries on its outer end a cam 78. This cam may be keyed or otherwise rigidly affixed to shaft 74. The coils 80 of the solenoid are fixed and are surrounded by a case 81. Shaft 74 carries an armature hub 83 on the outer end of which is an armature plate 82. This plate is spaced from the coil case 81 by a relatively small air gap and is arranged to rotate through a determined angle upon application of current to the coils 80.

Rotation of armature plate 82 is effected by means of a plurality of sloping grooves or races 84 located in the face of the covering case 81 and a series of corresponding sloping grooves or races 86 located on the under side of the armature plate. In the ordinary form there will be three pairs of opposed grooves and between each pair of grooves is positioned a steel ball 88 located, when the case and armature plate are in maximum spaced condition, as shown in Fig. 10. When coil 80 is energized, armature hub 83 will tend to move to the left, as viewed in Figs. 3 and 10. Because of the ball and groove construction as explained above, the armature plate 82 and cam 78, as viewed in Fig. 4, will be caused to rotate clockwise. That is, ball 88 will act as a bearing between the grooves 84 and 86 with groove 86 moving in the direction of groove 84 until the ball 88 has reached the bottom of both grooves. It will be noted in Fig. 10 that the grooves 84 and 86 are curved, having their steepest slopes at the outer ends of the grooves, flattened off as the bottoms of the grooves are approached. Thus, while the pull of the coil 80 on armature hub 83 is less at the start of the stroke than at the finish, this is compensated for by the changing slope of the grooves 84 and 86. As a result, the torque applied to the cam 78 as armature plate 82 rotates will be substantially constant over the entire angular movement of the cam.

Referring to Figs. 4, 6 and 7, it will be seen that on either side of cam 78 are positioned a pair of rollers 90 and 92 against which the cam 78 acts. Roller 90 is carried by a shaft 94, supported at its ends by a bracket 96. Additionally mounted on shaft 94, alongside of roller 90, is another roller 98, the purpose of which will be described hereinafter. Bracket 96 is adjustably supported with respect to lever 44 by means of the threaded stud 100, whose position with respect to the lever may be varied by the nuts 102 and 104. A pin 106, affixed to an extension of bracket 96, extends slidably through a hole in lever 44 to insure that the bracket is maintained at a constant angle with respect to the lever.

Similarly roller 92 is mounted on shaft 108, carried by bracket 110 which is adjustably mounted with respect to lever 42 by the stud 112 and nuts 114 and 116. A pin 118, carried by an upward extension of bracket 110, extends slidably through a hole in lever 42 to prevent rotation of this bracket. A second roller 120, similar to roller 98, is carried by shaft 108 alongside of roller 92.

In Fig. 9 is shown an enlarged front view of cam 78 and rollers 90 and 92. In the solid line position, the cam is shown in "on" position. That is, the cam is out of engagement with the rollers and therefore no spreading force is being exerted on levers 42 and 44. Under this condition, the spring 62 is drawing the levers together so that the brake shoes are being applied to the brake drum.

The cam 78 is symmetrical and the leading parts 122 and 124 of the two cam surfaces are at a steeper pitch than the rear portions of the surfaces as at 126 and 128. Thus, when the cam is rotated clockwise under the influence of the rotary solenoid, rollers 90 and 92 will be engaged and be spread laterally equal distances while they ride on the steep portions 122 and 124. As the cam continues its rotation to final position, as indicated by the dotted line in Fig. 9 and as shown in Fig. 11, the rollers will be resting on those portions of the cam faces 126 and 128 which have only a slight pitch. It is believed apparent from this construction that a greater force must be applied by the cam to the rollers to do the initial spreading of the levers than will be required to maintain the cam at final position of reduced pitch. While the total lateral movement of the rollers, when acted upon by the cam, will not be great, still it will be sufficient to free each brake shoe completely from the brake drum. This is so because of the fixed nature of the several elements. That is, the pivot points 46 and 48 are fixed, the shaft 74 that carries cam 78 is fixed, the cam surfaces that engage rollers 90 and 92 are symmetrical and equally spaced from the center of shaft 74. Therefore, by proper adjustment of the rollers 90 and 92 with respect to levers 44 and 42, it follows that each of the levers will be moved outward an equal distance, which distance will be sufficient to completely free each brake shoe from the brake drum 34. Thus, complete release of the brake is accomplished immediately upon actuation of cam 78 in a clockwise direction, as viewed in Figs. 4 and 9.

It will be noted in Figs. 4, 6 and 7 that rollers 90 and 92 are set at an angle with respect to cam 78. The reason for this is that when the rotary solenoid is actuated to rotate shaft 74, the shaft moves a slight distance longitudinally to the left, as viewed in Fig. 3. This is so because of the nature of the grooves 84 and 86 which permit armature plate 82 to move to the left toward the coil 80 as it rotates through its determined angle. Therefore, cam 78, when actuated, not only rotates, as previously explained, but also moves to the left a short distance, as viewed in Fig. 3. Therefore, by setting rollers 90 and 92 at an angle, as shown in Figs. 4, 6 and 7, there will be true rolling contact between the surfaces of the cam and the rollers. Since the rollers are additionally mounted on fine anti-friction bearings, the resistance to rotation of the rollers is reduced to a negligible quantity so that substantially all of the force applied by the cam will be used in overcoming spring 62.

Furthermore, the rotational resistance of the rollers is so slight that when the current to the solenoid is turned off, the slight angle of the cam surfaces at 126 and 128 will be sufficient under the compressive force of the rollers 90 and 92 on either side thereof under the influence of spring 62 to cause the cam to rotate counterclockwise to resume its original position as shown in Figs. 4 and 9.

From the description thus far, it will be understood that when the truck is stationary and the power is off, the brakes will be "on" by virtue of the tension of spring 62. When it is desired to start the truck motor, the operator will press a lever 130 on the handle 28 (see Fig. 2) which closes switch A in the circuit shown in Fig. 8. This circuit, which is battery operated, includes a resistance 132, the solenoid coil circuit 134 and a shunt 136 which shunt is normally closed by a switch 138 in position 139. Thus, as soon as switch A is closed, the rotary solenoid functions to rotate cam 78 to release the brake so that when power is applied to the motor thereafter the truck will be free to move. Further movement of lever 130 results in the closing of switch B which is in the motor circuit. However, until the switch 138 has been thrown to the dotted line position 140, the motor circuit cannot be closed. The shifting of switch 138 from the position 139 in which shunt 136 is closed to the position 140 in which the shunt is opened and the motor circuit is closed is accomplished in the following manner. It will be noted in Figs. 3 and 4 that the cam 78 has a rod 142 extending therethrough but its position does not interfere with the engagement of the cam surfaces with the rollers. The upper end of rod 142, when rotated, is of sufficient length to engage the head of an actuating rod 144 of a switch box 146 which contains the two sets of contacts 139 and 140, previously referred to. When cam 78 is actuated and has reached the dotted line position, shown in Fig. 9, the brake will be completely released and this complete release occurs prior to the engagement of rod 142 with plunger 144. Thus, it is impossible for the motor circuit to be closed prior to complete release of the brake. As soon as the switch has assumed the position at 140, the motor will start if switch B has therefore been closed or will start as soon as switch B is thereafter closed. Thus, it is immaterial whether the operator in his haste moves lever 130 rapidly causing quick sequential closing of switches A and B, or moves lever 130 more leisurely since the motor cannot start until switch 139 has been opened and switches B and 140 have been closed.

It should further be noted that as soon as switch 139 is opened, resistance 132 is thrown into the solenoid circuit thus reducing the current flow through the solenoid. However, the reduced current is sufficient to hold cam 78 in the dotted line position of Fig. 9 since the rollers 90 and 92 are at that time in engagement with the low pitched surfaces 126 and 128.

Further, with respect to Fig. 8, the motor circuit is schematically indicated at 148 with switching connections for forward and reverse being shown at F and R. These switches are controlled by switches 150 and 152 on the end of handle 28. Thereafter, when the operator releases lever 130, he first breaks the motor circuit at B, turning off the power. As soon as switch A is opened, the solenoid circuit is broken so that cam 78 is no longer urged by the solenoid in its clockwise brake "off" position. Immediately thereafter, the inward pressure of rollers 90 and 92 against the sloping cam surfaces causes cam 78 to rotate counter-clockwise so that levers 42 and 44, drawn by spring 62, can move toward each other to cause the brake shoes to engage the brake drum, thus applying the brake and stopping the truck.

If the electrical power should fail so that it therefore became impossible to release the brake in the manner just described through operation of the rotary solenoid, then it will be necessary to provide other auxiliary means for releasing the brakes so that the truck may be towed to the service station. In the present instance, we have provided a manual release mechanism which operates as follows. The plate 70 has affixed thereto a U-shaped extension 154 (see Figs. 3, 6 and 7) which carries on its face a stud 156 having on its inner end a rotatable cam 158. Stud 156 is axially aligned with shaft 74 so that the cams 78 and 158 turn on aligned centers. Welded to the bottom portion of cam 158, as can be seen in Figs. 3, 4, 6 and 7, is a lever 160 that extends downwardly a sufficient distance for adequate leverage but clears the floor on which the truck rests. The upper end of lever 160 has a horizontal U-shaped portion especially designed for reasons which will appear hereinafter. As shown in Fig. 4, lever 160 can be swung from the solid line position at the left to the dotted line position at the right and in so doing, the cam 158 will be rotated counter-clockwise through a corresponding angle. In order to maintain lever 160 to the left or right, a curved spring 162 is provided with its ends hooked over the bottom portion of extension 154. This spring is slightly flattened as lever 160 is shifted and is effective to hold the lever and the cam in either selected position.

Cam 158, as shown in Fig. 4, is in brake "on" position. When it is rotated to the left by moving lever 160, the cam surfaces will engage rollers 98 and 120, carried by brackets 96 and 110 along with rollers 90 and 92, to spread the lever arms 42 and 44 sufficiently to release the brake shoes in the same manner that rotation of cam 78 clockwise is capable of so doing. Therefore, when the operator finds it necessary to cause manual release of the brake, he merely moves lever 160 by hand or foot from the left to the right, in which position it will be maintained by the engagement of spring 162 with the under side of the horizontal portion 164 of the upper part of the lever. The truck may then be towed to the service station for recharging or replacing of the batteries or other correction of the power supply.

After the truck is again in condition for normal operation, it is essential for safe operation that cam 158 be thrown to brake "on" position, which is the position shown in Fig. 4. If this is not done then upon actuation of the truck by the motor, no braking force will be available to stop the truck when the motor is shut off. Since experience has shown that operators occasionally fail to put the manually actuated brake releasing means in "on" position before recommencing normal use of the truck, we have provided automatic means which will insure this result. The rod 142, previously referred to, has a lower extension 166, long enough to engage the curved rear portion 168 of lever 160 in Figs. 3, 6 and 7. If we assume that the lever 160 is in dotted line position, as viewed in Fig. 4, with the brakes released, actuation of rotary solenoid 72 will cause end 166 to be moved clockwise to engage portion 168 to throw lever 160 from dotted line position to full line position, thus automatically shifting the cam 158 from brake "off" to brake "on" position. While this is occurring, however, cam 78 is moving from brake "on" position to brake "off" position so that by the time lever 142 has engaged push rod 144 of switch 138, the brakes will be "off" and the truck may be free to move under the power supplied immediately thereafter by the motor. When the motor is subsequently shut off, cam 158 will be in "on" position and the spring 62 will therefore be effective to cause rotation of cam 78 counter-clockwise bringing it to "on" position so that the spring can then apply the brakes in the manner previously explained.

In summary, it will be seen that we have provided a novel type of brake that is of especial use with a truck of the type described, in which the brake is released by a rotary solenoid utilizing far less current than has heretofore been possible with push-pull solenoids. Thus, there is not only economy in power consumption but a substantial reduction in cost because of the smaller and lower priced switches that may be used and the elimination of relay operated contactors necessary with higher power requirements. In addition, the manual brake release mechanism will automatically be restored to "on" position upon any subsequent operation of the solenoid. Our construction, therefore, insures that the brake will be fully released before the driving motor can come into operation.

It is our intention to cover all changes and modifications of the example of the invention herein chosen for purposes of the disclosure which do not constitute departures from the spirit and scope of the invention.

We claim:

1. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes toward said drum, a cam positioned between said levers which cam upon actuation will overcome said spring means and move said levers and brake shoes away from said brake drum, said cam being actuated by a rotary solenoid, said levers having attached thereto rollers for engaging said cam, each of said rollers being set at an angle to the plane of rotation of said cam and positioned on opposite sides of said cam, said cam upon actuation of said rotary solenoid positioned to engage said rollers with true rolling contact to move said levers and brake shoes to free said brake drum as aforesaid.

2. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes toward said drum, a cam positioned between said levers which cam, upon actuation, will overcome said spring means and move said levers and brake shoes away from said brake drum, said cam being actuated by a rotary solenoid, said cam having two cam surfaces, each surface adapted to engage a rotatable member connected to one of said levers, the pitch of the surface of said cam changing from a greater to a lesser pitch as said cam is rotated under said rotatable members and acting thereby to spread said levers and to release said brake drum.

3. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes toward said drum, a cam positioned between said levers which cam, upon actuation, will overcome said spring means and move said levers and brake shoes away from said brake drum, said cam being actuated by a rotary solenoid, said cam having fixed in relation thereto an arm rotatable through an arc upon actuation of said rotary solenoid, a switch actuated by said arm only when said cam has rotated far enough to cause complete release of said brake drum, said switch before actuation being closed to complete said solenoid circuit during brake release and after actuation completing a motor circuit to permit actuation of said motor.

4. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes toward said drum and an electrically rotated cam positioned between said levers which upon actuation will overcome said spring means and move said levers and brake shoes away from said brake drum to brake "off" position, a second cam manually rotatable in the opposite direction from said first cam from brake "on" position to brake "off" position, means connected with said levers adapted to be engaged by said second cam whereby upon manual rotation of said second cam from brake "on" position, said brake shoes may be moved to brake "off" position and means for causing said second cam to be in brake "on" position whenever said first cam is in brake "off" position.

5. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said drum, a second cam manually rotatable in the opposite direction from said electrically rotated cam from brake "on" position to brake "off" position, means connected with said levers adapted to be engaged by said second cam whereby upon rotation of said second cam from brake "on" position said brake shoes may be moved to brake "off" position when said electrically rotated cam is in brake "on" position and means fixed with respect to said electrically rotated cam for automatically moving said second cam, if said latter cam is then in brake "off" position, from brake "off" to brake "on" position whenever said electrically rotated cam is moved from brake "on" to brake "off" position.

6. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, said cam being mounted on a shaft, an armature hub secured to said shaft, an electrical coil co-axial with said shaft and means for causing longitudinal and rotational movement of said armature hub, shaft and cam upon the application of current to said coil.

7. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, said cam being mounted on a shaft, an armature hub and an armature plate attached to said shaft, a coil for drawing said armature hub and armature plate towards said coil upon the application of current thereto, and opposed inclined surfaces with rollers therebetween, one of said surfaces fixed with respect to said coil and the other of said surfaces fixed with respect to said armature plate whereby said plate will be caused to rotate through a determinable angle when it is drawn toward said coil upon the application of current thereto.

8. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, a second cam manually rotatable in the opposite direction from said electrically rotated cam from brake "on" position to brake "off" position, means connected with said lever adapted to be engaged by said second cam upon manual rotation thereof whereby said brake shoes may be moved to brake "off" position when said electrically rotated cam is in brake "on" position, and means operable simultaneously with said electrically rotated cam for moving said second cam from brake "off" position to brake "on" position whenever said second cam is in brake "off" position when said electrically rotated cam is actuated.

9. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum to brake "off" position, a second cam manually movable from brake "on" to brake "off" position to release said brakes when said electrically rotated cam is in brake "on" position and means for automatically moving said second cam when in brake "off" position to brake "on" position whenever said electrically rotated cam is actuated.

10. The combination of a brake drum and a brake for applying a braking force to said drum, said brake comprising brake shoes carried by levers positioned to permit said brake shoes to be pressed against opposite sides of said brake drum, spring means for constantly urging said levers and brake shoes toward said drum, a first cam positioned between said levers which upon rotation will overcome said spring means and move said levers and brake shoes equal distances away from said brake drum, a second cam manually movable to actuate said lever for releasing said brake shoes from said brake drum independently of said first cam and means operable simultaneously with said first cam when said first cam moves to brake released position for rendering said second cam ineffective to hold said brakes in released position when said first cam thereafter returns to brake engaging position.

11. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, said cam being mounted on the shaft of a rotary solenoid and having two diametrically opposite cam surfaces, each surface adapted to engage an anti-friction member connected to one of said levers, the pitch of the surfaces of said cam changing from a greater to a lesser pitch as said cam is rotated with respect to said anti-friction members, the greater pitch portions of said surfaces acting through said anti-friction members to cause adequate separation of said levers to release said brake drum, the lesser pitch portions of said surfaces acting against said anti-friction members to hold said brake in released position, and means for automatically causing reduction in the current consumption by said rotary solenoid after said anti-friction members have been engaged by the lesser pitch portions of said cam.

12. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, said cam being mounted on the shaft of a rotary solenoid and having two diametrically opposed cam surfaces, each surface having a leading relatively steep pitch portion and an adjacent lesser pitch portion, anti-friction members connected to said levers and positioned to be engaged by said cam when said cam is rotated through a limited angle, said steep pitch portion to said cam surfaces on engaging said anti-friction members being adapted to cause sufficient spreading of said levers to release said brake and said lesser pitch portions of said cam surfaces on engaging said anti-friction members being adapted to hold said brake in released position, an electrical circuit for applying maximum current to said rotary solenoid while said anti-friction members are in engagement with said steep pitch portions and means for reducing the current consumption by said rotary solenoid after said lesser pitch portions have come into engagement with said anti-friction members.

13. The combination of a brake drum and a brake for applying a braking force to said drum, said brake comprising brake shoes carried by pivotally mounted levers positioned to permit said brake shoes to be pressed against opposite sides of said brake drum, spring means for constantly urging said levers and brake shoes towards said drum, an electrically rotated cam positioned between said levers which cam, upon actuation, will overcome said spring means and move said levers and brake shoes away from said brake drum, said cam being mounted on the shaft of a rotary solenoid and having two diametrically opposed cam surfaces thereon, said surfaces adapted to engage opposed anti-friction members connected to said levers, the pitch of said surfaces of said cam being relatively steep at the leading portions and then changing to a lesser pitch, means for applying substantially constant torque to said cam while said steeper pitch portions are in engagement with said anti-friction members, and means for applying reduced torque to said cam after said anti-friction members have been engaged by the said lesser pitch portions whereby said brake may be held in released position by the use of less current than the current required to move said brakes from engaged to released position.

References Cited in the file of this patent

UNITED STATES PATENTS

| Number | Name | Date |
|---|---|---|
| 1,159,238 | Leonard | Nov. 2, 1915 |
| 1,178,115 | Wheeler | Apr. 4, 1916 |
| 1,980,974 | Apple | Nov. 26, 1934 |
| 2,065,382 | Levy | Dec. 22, 1936 |
| 2,473,598 | Leland | June 21, 1949 |
| 2,491,850 | Browning | Dec. 20, 1949 |